US012641432B2

(12) United States Patent
Brand et al.

(10) Patent No.: US 12,641,432 B2
(45) Date of Patent: May 26, 2026

(54) SECURE TRAIN COMMUNICATION TECHNIQUES

(71) Applicant: Progress Rail Locomotive Inc., LaGrange, IL (US)

(72) Inventors: John William Brand, Merritt Island, FL (US); Evan P Sevel, Wexford, PA (US)

(73) Assignee: Progress Rail Locomotive Inc., LaGrange, IL (US)

( * ) Notice: Subject to any disclaimer, the term of this patent is extended or adjusted under 35 U.S.C. 154(b) by 202 days.

(21) Appl. No.: 18/667,416

(22) Filed: May 17, 2024

(65) Prior Publication Data

US 2024/0397319 A1      Nov. 28, 2024

Related U.S. Application Data

(60) Provisional application No. 63/504,113, filed on May 24, 2023.

(51) Int. Cl.
| | |
|---|---|
| *H04W 12/106* | (2021.01) |
| *H04B 1/713* | (2011.01) |
| *H04W 12/037* | (2021.01) |
| *H04B 1/69* | (2011.01) |

(52) U.S. Cl.
CPC .......... *H04W 12/106* (2021.01); *H04B 1/713* (2013.01); *H04W 12/037* (2021.01); *H04B 2001/6904* (2013.01)

(58) Field of Classification Search
CPC ... H04W 12/106; H04W 12/037; H04B 1/713
See application file for complete search history.

(56) References Cited

U.S. PATENT DOCUMENTS

| | | | |
|---|---|---|---|
| 8,437,287 B2 | 5/2013 | Parker | |
| 10,700,970 B2 | 6/2020 | Cooper et al. | |
| 10,841,063 B2 * | 11/2020 | Nammi | H04L 1/0025 |
| 10,856,296 B2 * | 12/2020 | Yerramalli | H04W 68/02 |
| 10,945,293 B2 * | 3/2021 | Lei | H04B 1/713 |

(Continued)

FOREIGN PATENT DOCUMENTS

RU          2348560 C1      3/2009

*Primary Examiner* — Viral S Lakhia

(57) ABSTRACT
A mechanism to communicate in a secure manner between locomotives of a train consist is disclosed. Controllers on locomotives generate data packets and encode them according to one of a plurality of modulation schemes and transmit the encoded data packets according to one of a plurality of frequencies. The frequencies and/or modulation schemes used to transmit data are changed periodically by the transmitting controller in a sequence. The receiving controller is aware of the current frequency and/or modulation scheme being used and can, therefore, decode the transmitted data. Since the transmission frequency and/or modulation scheme is not known by a malicious actor, the data communications between the controllers is secure. The sequence of frequencies and/or modulation schemes may be communicated between the two controllers during a handshaking procedure to set up communications. Clocks of the communicating controllers may be synchronized to enable the frequency and/or modulation hopping scheme.

17 Claims, 6 Drawing Sheets

(56)                    References Cited

U.S. PATENT DOCUMENTS

| | | | | |
|---|---|---|---|---|
| 11,770,410 | B1 * | 9/2023 | Warmenhoven | H04L 9/0894 |
| | | | | 726/22 |
| 11,943,610 | B2 * | 3/2024 | Dai | H04W 72/23 |
| 12,256,214 | B2 * | 3/2025 | Elshafie | H04W 12/033 |
| 2020/0154293 | A1 | 5/2020 | O'Mahony et al. | |
| 2020/0389347 | A1 * | 12/2020 | Wei | H04L 5/0051 |
| 2024/0147228 | A1 * | 5/2024 | Zamoon | H04W 12/03 |

* cited by examiner

200

PERFORM A HANDSHAKING PROTOCOL WITH A RECIPIENT LOCOMOTIVE THAT INCLUDES COMMUNICATING A FREQUENCY AND/OR MODULATION SEQUENCE
202

IDENTIFY DATA TO BE SENT TO THE RECIPIENT LOCOMOTIVE
204

GENERATE A DATA PACKET THAT INCLUDES AN IDENTIFIER OF THE RECIPIENT LOCOMOTIVE AND THE DATA
206

SEND THE DATA PACKET TO THE RECIPIENT LOCOMOTIVE USING A FREQUENCY AND/OR MODULATION SCHEME ACCORDING TO THE FREQUENCY AND/OR MODULATION SEQUENCE
208

*FIG. 2*

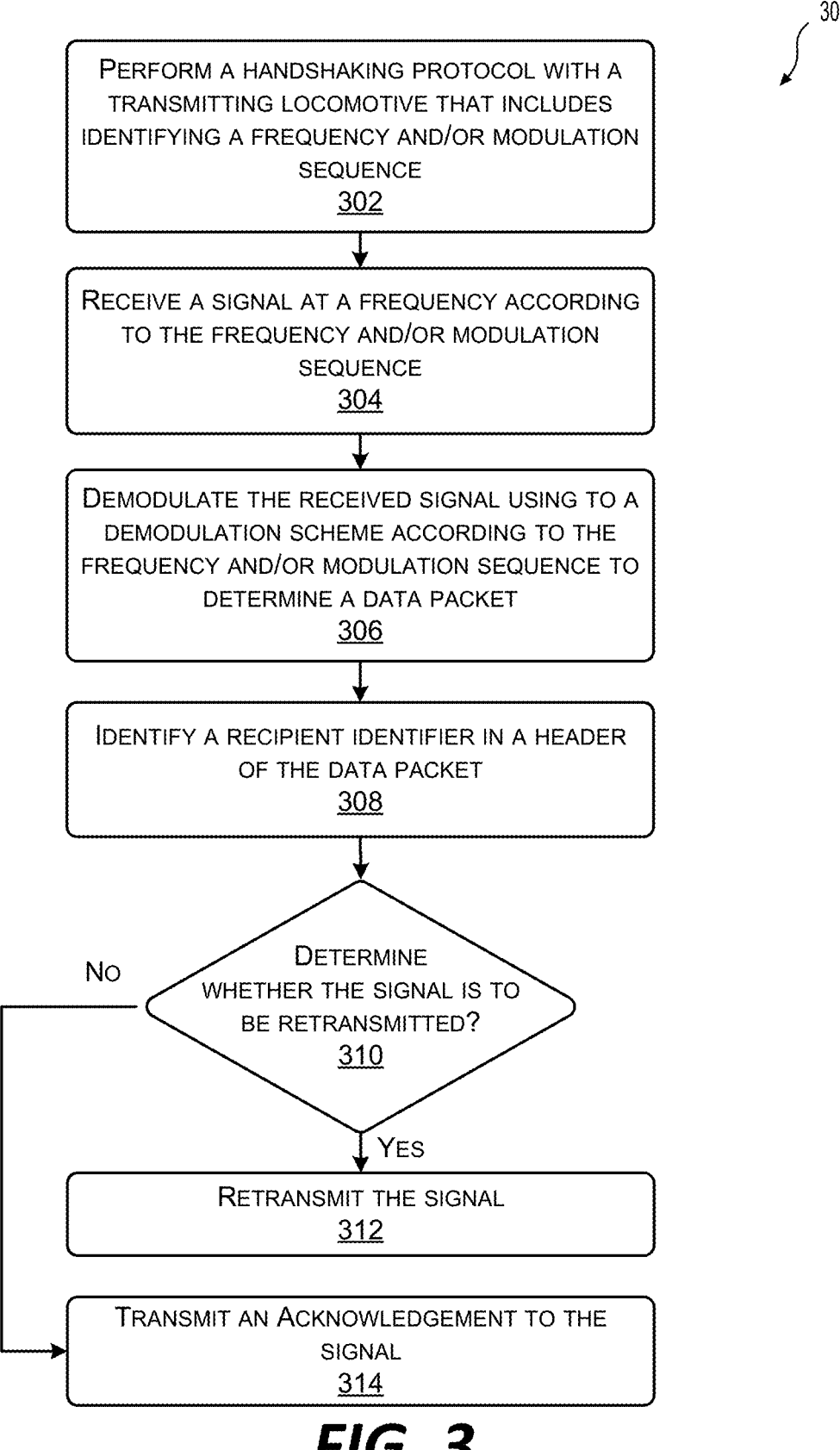

300

PERFORM A HANDSHAKING PROTOCOL WITH A
TRANSMITTING LOCOMOTIVE THAT INCLUDES
IDENTIFYING A FREQUENCY AND/OR MODULATION
SEQUENCE
302

RECEIVE A SIGNAL AT A FREQUENCY ACCORDING
TO THE FREQUENCY AND/OR MODULATION
SEQUENCE
304

DEMODULATE THE RECEIVED SIGNAL USING TO A
DEMODULATION SCHEME ACCORDING TO THE
FREQUENCY AND/OR MODULATION SEQUENCE TO
DETERMINE A DATA PACKET
306

IDENTIFY A RECIPIENT IDENTIFIER IN A HEADER
OF THE DATA PACKET
308

DETERMINE
WHETHER THE SIGNAL IS TO
BE RETRANSMITTED?
310

No

YES

RETRANSMIT THE SIGNAL
312

TRANSMIT AN ACKNOWLEDGEMENT TO THE
SIGNAL
314

DETERMINE A MASTER CLOCK TIME
402

ENCODE, AS A SIGNAL, THE MASTER CLOCK TIME
ACCORDING TO A CURRENT FREQUENCY AND/OR
MODULATION
404

TRANSMIT THE SIGNAL
406

500

SECURE TRAIN COMMUNICATION TECHNIQUES

CROSS REFERENCE TO RELATED APPLICATIONS

This application claims the benefit of U.S. Provisional Application No. 63/504,113 filed May 24, 2023, which is incorporated herein by reference in its entirety.

TECHNICAL FIELD

The present disclosure relates to communications between locomotives of a train or a consist of locomotives. More specifically, the present disclosure relates to providing secure communications between locomotives.

BACKGROUND

Train locomotives are coupled together with other locomotives and freight cars to move freight across large distances in a fuel-efficient and cost-effective manner. The linked locomotives, or consist of locomotives, are used to distribute the hauling load and the stopping load of the train across the multiple locomotives in the consist. Linking the locomotives allow the operation of the train in an efficient manner, to keep the cost of freight movement down. Efficient operation involves keeping the downtime, non-movement, and/or slowdown of a consist to a minimum. To operate trains efficiently, communications may be required between locomotives of the train to coordinate the movement of freight. The communications enable distributed hauling and braking across multiple locomotives of a consist, automated coupling/decoupling of locomotives, and/or other automated train operations (ATO). For example, a plurality of locomotives may need to accelerate at the same time to achieve a desired speed of the train. Such an acceleration across multiple locomotives may need to be coordinated to occur at the same time, requiring communications between those locomotives.

The process of communicating between locomotives may pose a variety of challenges, such as security and/or hacking risks. A malicious actor may wish to intercept communications, retransmit communications, block communications, and/or transmit false communications. For example, a malicious actor may position themselves along a train track and transmit malicious operational instructions to locomotives of a train consist, which may lead to improper operations of the train, or even break-in-two or derailment. A malicious actor may also wish to record communications between locomotives of one train consist and retransmit that recorded communications in situations where that retransmission may be dangerous to the operations of the same or other trains. These types of hacking and/or security risks are therefore a concern for train operators who wish to operate their trains in more automated and coordinated ways, such as ATO.

One mechanism for communications between locomotives using various communications channels is described in U.S. Pat. No. 10,700,970 (hereinafter referred to as "the '970 reference"). The '970 reference describes locomotives that check a first plurality of channels and a second plurality of channels for availability for communications and then selects channels for communications between locomotives. The '970 reference describes a mechanism for routing messages through one or more of the network channels in dependence upon the monitored operational statuses of the network channels. However, the systems and methods described in the '970 reference do not pertain to preventing security issues and/or hacking communications between locomotives. Thus, the disclosure of the '970 reference does not describe how to use schemes for thwarting hacking to enable more automated train operations.

Examples of the present disclosure are directed toward overcoming one or more of the deficiencies noted above.

SUMMARY

In an aspect of the present disclosure, a locomotive includes a controller including one or more processors and one or more computer-readable media storing computer-executable instructions that, when executed by the controller, cause the controller to send first data to a second controller, the second controller associated with a second locomotive, the first data including an identifier of the controller. The controller is also configured to receive, based at least in part on the first data, an acknowledgement message from the second controller, send, at a first time, second data to the second controller using a first channel associated with a first frequency and using a first modulation scheme, and send, at a second time, third data to the second controller using a second channel associated with a second frequency and using a second modulation scheme.

In another aspect of the present disclosure, a method of communicating between a first locomotive and a second locomotive includes identifying, by a controller, a first data to be transmitted to the second locomotive. The method further includes sending, by the controller and at a first time, the first data to the second locomotive using a first modulation scheme and identifying, by the controller, a second data to be transmitted to the second locomotive. The method still further includes sending, by the controller and at a second time, the second data to the second locomotive using a second modulation scheme different from the first modulation scheme.

In yet another aspect of the present disclosure, a locomotive communication system includes a controller including one or more processors and one or more computer-readable media storing computer-executable instructions that, when executed by the controller, cause the controller to receive identity data from a second controller, the second controller associated with a second locomotive, the identity data including an identifier of the second controller. The controller is further configured to determine, based at least in part on the identifier, a modulation scheme sequence and receive a first signal from the second controller. The controller is still further configured to identify, based at least in part on the modulation scheme sequence, a demodulation scheme to use to decode the first signal and decode the first signal using the demodulation scheme.

BRIEF DESCRIPTION OF DRAWINGS

FIG. 2 is a flow diagram depicting an example method for communicating between locomotives with a coordinated frequency and/or modulation hopping scheme, according to examples of the disclosure.

FIG. 3 is a flow diagram depicting an example method for securely transmitting messages, according to examples of the disclosure.

DETAILED DESCRIPTION

Wherever possible, the same reference numbers will be used throughout the drawings to refer to the same or like parts.

Figure 1:
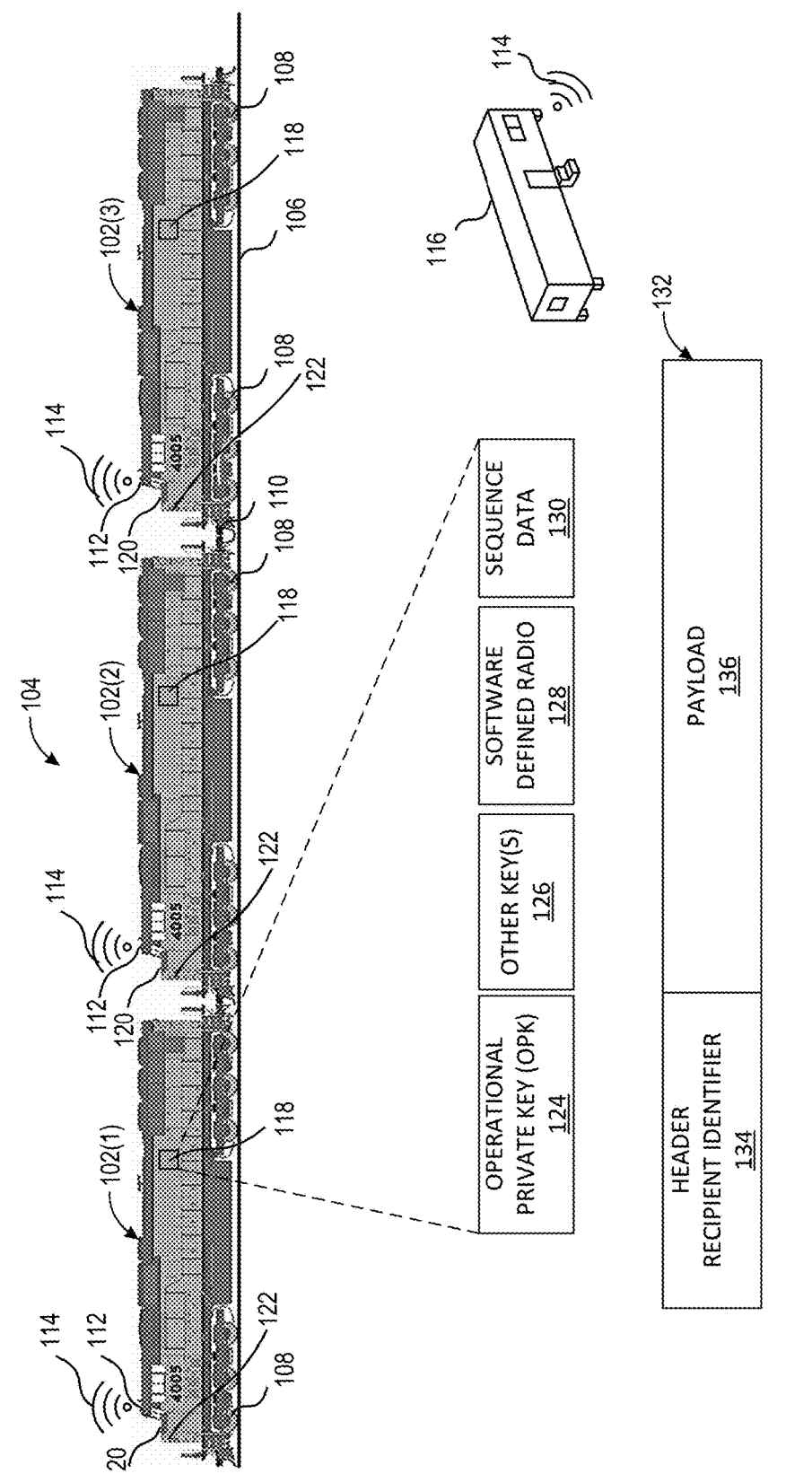
FIG. 1 is a schematic illustration of an example environment with a plurality of locomotives in a consist that are configured to communicate with each other, according to examples of the disclosure.

FIG. 1 is a schematic illustration of an example environment 100 with a plurality of locomotives 102(1), 102(2), 102(3) in a consist 104 that are configured to communicate with each other, according to examples of the disclosure. The locomotives 102(1), 102(2), 102(3), hereinafter referred to singularly as locomotive 102 or in the plural as locomotives 102, may be coupled to each other to form the consist 104 of locomotives 102, or the train consist 104. The consist 104, although depicted with three locomotives 102, may have any number of locomotives 102 and/or cars (not shown). In some cases, the consist 104 may have cars (or non-powered units) between locomotives 102.

The locomotives 102 may be of any suitable type, fuel type, size, horsepower rating, displacement, engine size, or the like and capable of running on any suitable railroad track 106 that the locomotives 102 engage with any suitable wheels 108. For example, in some cases, the locomotives 102 may be diesel-electric locomotives that run on standard gauge railroad tracks 106. The locomotives 102 may be powered by an engine (not shown) and configured to pull one or more cars (not shown) that can carry freight and/or passengers. Although the locomotives 102 of FIG. 1 are depicted as freight locomotives 102, it should be understood that the disclosure herein pertains to any type of trains and constituent locomotives 102, such as passenger trains or the like.

The locomotives 102 may be coupled to each other and/or to non-powered cars as a consist 104 using coupler assemblies 110. In some cases, the coupler assemblies 110 may include a coupler (not shown), with a draft gear (not shown) on other side of the coupler assembly 110. The coupler assemblies 110 allow for one consist 104 (or locomotive 102) to couple with another consist 104 (or locomotive 102). In some cases, the coupler assemblies allow locomotives 102 and/or consists 104 to couple automatically, as locomotives 102 and/or consists 104 come in contact with each other. In some cases, the coupler assemblies 110 also allow for coupling two consists 104 at or near normal operating speed. The coupler assemblies 110 may be of any type suitable type and size of automatic coupler. The couplers assemblies 110 may be any one or more of Janney, buckeye, knuckle, Alliance coupler, TypeE, TypeF, TypeH, Ward, Henricot, Willison, Unicoupler, Intermat, Unilink, combinations thereof, or the like. Some consists 104 may have the same coupler type between all locomotives 102 and/or cars. Other consists 104 may have different coupler types between some locomotives 102 and/or cars. During ATO, if coordination between locomotives 102 is faulty or have been hacked by a nefarious entity, then the coupler assemblies 110 within locomotives can become stressed and even break. The techniques disclosed herein reduce the possibility communications hacking, which could cause damage to the coupling assemblies between locomotives 102.

The locomotive 102 may further include an antenna 112 for transmitting and receiving wireless signals 114 that carry communications information. In this way, the locomotives 102 can communicate with each other or with a ground station 116. For example, a lead locomotive 102 may instruct other locomotives 102 of its consist 104 with operating instructions, such as accelerating, decelerating, magnitudes thereof, or the like, via the antenna 112 and wireless signals 114. Similarly, locomotives 102 may communicate operational status and/or confirmation messages, such as an indication that brakes have been applied, to the lead locomotive 102 or any other controlling or master locomotive 102. The ground station 116, such as a trailer or tower proximal to the rails 106, may also be configured to communicate operational instructions to the locomotives 102, communicate other data, such as terrain maps, to the locomotives 102, and/or receive status information from the locomotives 102. It should be noted that the locomotives 102 may alternatively or additionally be configured to communicate via non-wireless links, such as physical wired links between locomotives 102 within a consist 104.

The locomotives 102 may further include one or more controllers 118, hereinafter referred to singularly as controller 118 or in the plural as controllers 118. The controllers 118 control various aspects of their respective locomotives 102, and, in some cases, aspects of other locomotives 102 and/or cars in a consist 104. In some cases, the controller 118 may also be referred to as an electronic control module (ECM) of the locomotive 102 that controls various aspects of the locomotive 102.

In some cases, when multiple locomotives 102 are joined in a consist 104, their respective controllers 118 may establish a hierarchy. For example, the controller 118 of the lead locomotive 102, or the locomotive 102 that is in front of the consist 104, may act as a master controller 118 to receive status updates from other controllers 118 and provide instructions to follow to the controllers 118 of the trailing locomotives 102 of the consist 104. Thus, in this example, a single controller 118 (e.g., the controller 118 of the lead locomotive 102) controls and coordinates the operation of the consist 104. In other cases, a more distributed decision making may be performed between the controllers 118 of locomotives 102 of a consist 104.

Controllers 118 may control the braking, electricals, and/or engine of its respective locomotive 102. Additionally, a controller 118 of a lead locomotive 102 may coordinate operational actions of other locomotives 102 and/or cars of its own consist 104. For example, under automatic train operations (ATO), the controller 118 of the lead locomotive 112 may coordinate the operations, such as acceleration, braking, signaling, or the like of the other locomotives 102 of the consist 104. In this way, a single point of coordination may be established, while individual control of the components (e.g., brakes, engine, etc.) remain local to individual locomotives 102 within the consist 104. Locomotives 102, by their respective controllers 118, may also be configured to provide status updates by communicating with the controller 118 of the lead locomotive 102 of a consist 118. In some cases, the controller 118 of a locomotive 102 may also be configured to receive and/or interpret control of the train by a human operator, such as a train engineer.

The controller 118 includes a central processing unit (CPU), a graphics processing unit (GPU), both CPU and GPU, single or multiple microprocessors, field programmable gate arrays (FPGAs), digital signal processors (DSPs), application-specific integrated circuits (ASICs), application-specific standard products (ASSPs), system-on-a-chip systems (SOCs), complex programmable logic devices (CPLDs), one or more cores, and/or other components, etc. Additionally, controller 118 may possess its own local memory, which also may store program modules, program data, and/or one or more operating systems. Numerous commercially available microprocessors can be configured to perform the functions of the controller 118. Various known circuits are operably connected to and/or otherwise associated with the controller 118 and/or the other circuitry of the locomotive 102. Such circuits and/or circuit components include power supply circuitry, inverter circuitry, signal-conditioning circuitry, actuator driver circuitry, pneumatic control, heating/cooling circuitry, etc. The present disclosure, in any manner, is not restricted to the type of controller 118 or the positioning depicted of the controller 118 and/or the other components relative to the locomotive 102. The controller 118 is configured to control the operations of the locomotive 102 and/or coordinate with other locomotives 102. According to examples of the disclosure, the controller 118 is also configured to communicate with other controller(s) 118 of other locomotives 102 in a secure manner. According to examples of the disclosure, the controller 118 is configured to coordinate communications with other controller(s) 118 in a scheme that uses a sequence of frequencies (e.g., channels) and/or modulation schemes.

The locomotive 102 may further include a light detection and ranging system (LiDAR or LIDAR) 120 and/or a stereoscopic visible/camera ranging system, referred to herein as power view 122. Both the LIDAR 120 and the power view 122 provide the corresponding controller 118 with signals indicative of the distance between the locomotive 102 and an object in front of the locomotive 102, such as another locomotive 102 or car of the same consist 104 or a locomotive or car of a different consist 104. Indeed, the locomotive 102 may include any number of different sensors that may send signals to the respective controller 118. The locomotive 102 may further include any number of other components, such as one or more of a location sensor (e.g., global positioning system (GPS)), an air conditioning system, a heating system, communications systems (e.g., radio, Wi-Fi connections), collision avoidance systems, sensors (e.g., RADAR, SONAR, etc.), cameras, etc. These systems are powered by any suitable mechanism, such as by using a direct current (DC) power supply and/or any other source.

In some instances, the communications between the controllers 118 and/or with the various other components and/or controllers of the locomotives 102 may be via any suitable protocol-based communications or any suitable non-protocol-based communications. In examples of the disclosure, the controller 118 may have wireless communicative connections (e.g., ad-hoc, point-to-point relay, Bluetooth, WiFi, Direct WiFi, etc.) with the various components of the locomotive 102 with which it communicates and/or other locomotives 102. In other cases, the controller 118 may have a mix of wired and wireless communicative links with the various components of the locomotive 102 with which it communicates and/or other locomotives 102. In examples of the disclosure, the controller 118 is configured to receive various information about the components (e.g., strain gauge, brakes, etc.), other locomotives 102, and/or ground station 116.

According to examples of the disclosure, the communications between locomotives 102 may be based on a channel or frequency hopping scheme, where a different frequency of transmission and reception of the wireless signal 114 may be used on a predetermined schedule (e.g., predetermined time periods or predetermined number of messages). In other examples of the disclosure, the communications between locomotives 102 may be based on a modulation hopping scheme, where a different modulation of transmission and reception of the wireless signal 114 may be used on a predetermined schedule. In yet other examples of the disclosure, the communications between locomotives 102 may be on both a frequency hopping and a modulation hopping scheme.

It will be appreciated that the frequency hopping and/or modulation hopping schemes, as disclosed herein, reduce the possibility of hacking communications signals. For example, a man-in-the-middle (MITM) attack may be more difficult if the attacker is not aware of the frequency band and/or the modulation scheme for communications between two locomotives 102 (or any two parties). Thus, a more secure communications can be had by the transmitting controller 118 and the receiving controller 118, if a potential hacker does not know what frequency and/or modulation technique is being used for the communications. Additionally, in some cases, the controllers 118 may further encrypt communications messages.

In some cases, a frequency hopping and/or modulation hopping schedule may be established between to controllers 118 while the controllers 118 perform a handshaking process to establish communications therebetween. During the handshaking process, a first controller 118 may share its operational private key (OPK) 124 with another controller 118 with which it may communicate. The handshaking process may involve sharing any number of other key(s) 126 and/or identifiers between the two controllers 118 that are to communicate.

As disclosed herein, the controllers 118 of the locomotives may operate as software defined radios 128 to enable the frequency hopping and/or modulation hopping schemes, as described. The controllers 118, during their handshaking protocols, may also share sequence data 130 that provides all communicating parties with information regarding the sequence of frequencies and/or modulation schemes to be used. In some cases, a frequency hopping sequence and/or a modulation hopping sequence may be stored as one or more table(s) in memory or storage accessible by the controllers 118. When a controller 118 identifies an OPK 124 of another controller 118 with which it will communicate, the controller 118 may access table(s) that define the hopping sequence (frequency and/or modulation hopping) associated with the OPK 124. In other cases, the OPK may be used (e.g., mathematically manipulated) to identify the hopping sequence to be used for further communications. In yet other cases, the sequence table defining the frequency hopping and/or the modulation hopping may be communicated during the handshaking process prior to communications between two controllers 118.

In some cases, such as during a handshaking process, a hierarchy may be established between the two controllers 118 that are to communicate. One of the controllers 118, such as the controller 118 associated with the lead locomotive 102 (e.g., the front locomotive 102 of a consist), may provide its OPK 124 and/or otherwise establish the sequence of frequency hopping and/or modulation hopping to be used for communications. It should be understood that in some cases one controller 118 may be a master or lead controller 118 and, in other cases, a different controller 118 may be established as the master or lead controller 118.

Regardless of the mechanism for communicating the sequence of the frequency and/or modulation hopping, the transmitting controller 118 and receiving controller 118 are synchronized with respect to the frequency and/or the modulation scheme that is to be used for any given message transmission, according to examples of the disclosure. The controllers 118, operating as SDRs 128, are configured to encode and/or decode messages according to a plurality of frequencies and/or modulation schemes. Therefore, when synchronized, a transmitting controller 118 and a receiving controller 118 may be configured to transmit and/or receive a data packet 132 using the same frequency and/or modulation scheme. Furthermore, an outside malicious element, without knowing the frequency and/or modulation scheme being used, may not be able to intercept, modify, block, repeat, or otherwise interfere with the transmitted and received data packet 132, thereby improving the security and/or robustness of the communications between the two controllers 118.

The data packet 132 that may be used for communications between controllers 118 of their respective locomotives 102 may include a header 134 and a payload 136. The header 134 may be of any suitable type and/or format and may include an identifier associated with an intended recipient of the data packet 132. In some cases, the identifier may be an operational private key (OPK) 124 of the recipient controller 118 or a value derived from the OPK 124 of the recipient controller 118. In other cases, the identifier may be one or more other key(s) 126 associated with the recipient controller 118.

The frequency hopping communications, as disclosed herein, may involve any number of suitable channels/frequencies. In some cases, there may be four channels: Channel 1:452.925 Megahertz (MHz); Channel 2:452.950 MHz; Channel 3:457.925 MHz; and Channel 4:457.950 MHz. In this case, a sending or transmitting controller 118 may transmit wireless signals 114 via their respective antenna 112 carrying one or more data packets 132 in a sequence that hops between the four aforementioned frequencies. In other words, the transmitting controller 118 may send some data packets 132 over a first channel, additional data packets 132 over a second channel, still further data packets 132 over a third channel, and so on and so forth. As disclosed herein, the sequence of the frequencies used may be predetermined, such as according to a predetermined sequence that is associated with the transmitting controller 118. Alternatively, the sequence, or order of the frequency hops, may be determined based at least in part on the recipient controller 118, randomly, or by any other suitable mechanism. It should be understood that the number of channels and/or the associated frequencies are merely examples. The disclosure herein contemplates any number of suitable channels/frequencies and at any frequency level. For example, alternate or additional channels may include 160 MHZ, 161 MHZ, 220 MHZ, or similar frequencies, or indeed any other frequencies that may be used for communications.

The modulation hopping communications, as disclosed herein, may involve any number of suitable modulation schemes. In some cases, there may be four different modulation schemes: frequency shift keying (FSK); Gaussian frequency shift keying (GFSK); quadrature phase shift keying (QPSK); and phase shift keying (PSK). In this case, a sending or transmitting controller 118 may transmit wireless signals 114 via their respective antenna 112 carrying one or more data packets 132 in a sequence that hops between the four aforementioned modulation schemes. In other words, the transmitting controller 118 may send some data packets 132 using a first modulation scheme, additional data packets 132 using a second modulation scheme, still further data packets 132 a third modulation scheme, and so on and so forth. As disclosed herein, the sequence of the modulation schemes used may be predetermined, such as according to a predetermined sequence that is associated with the transmitting controller 118. Alternatively, the sequence, or order of the modulation scheme hops, may be determined based at least in part on the recipient controller 118, randomly, or by any other suitable mechanism. It should be understood that the number and/or type of modulation schemes are merely examples. The disclosure herein contemplates any number of suitable modulation schemes of any suitable type. For example, alternate or additional channels may include binary phase shift keying (BPSK), higher order phase shift keying, amplitude modulation (AM), quadrature amplitude modulation (QAM), amplitude shift keying (ASK), combinations thereof, or indeed any other modulation schemes that may be used for communications.

According to examples of the disclosure, both the frequency and the modulation scheme used for communications between two controllers 118 may be modified periodically. In other words, communications may be established between two locomotives 102 and their respective controllers 118, where the frequency (e.g., the carrier frequency) and the modulation scheme hop from one combination to another and then another and so on. The hopping of the frequencies and the modulation schemes may be according to a predetermined sequence, such as one based at least in part on the master controller 118 (e.g., the controller that initiates communications and/or the one that mostly provides instructions). The master controller 118, in some cases, may be the controller 118 of the lead locomotive 102 and the controllers 118 of the other locomotives 102 of the consist 104 may be subordinate controllers 118.

When both the frequency and the modulation schemes are hopped, the transition from one frequency and modulation scheme pair to the next may be done on a time schedule (e.g., at a predetermined time, at every predetermined time period after communications commence, etc.) or on a message schedule (e.g., after every message is sent and received, after every five messages, etc.). When both the frequency and the modulation scheme are hopped, as discussed herein, there may be a relatively large number of potential hops. For example, if four different frequencies and four different modulation schemes are used, any given hop may be to one of 256 different combinations. This large number of potential hops may be difficult for an outside malicious actor to predict, thereby reducing the malicious actors ability to intercept, retransmit, block, or otherwise modify any transmitted messages.

When there are such large number of possible frequency and modulation scheme combinations available, it is important for the transmitting and receiving controllers 118 to be synchronized, such that both the transmitting and receiving parties know the frequency and the modulation scheme to be used. The synchronization across all the locomotives 102 of a consist 104 may be based on the synchronization of clocks and/or messages between the controllers 118 communicating. In the cases, of synchronization with messages, the receiving and transmitting parties may know that a predetermined number of messages (e.g., three data packets 132, four data packets 132, ten data packets 132, etc.) may be sent and/or received before the frequency and the modulation scheme hops to the next combination of the predetermined sequence, as known to the communicating controllers 118. In this way, all of the controllers 118, with their respective locomotives 102, may stay synchronized with respect to the frequency and the modulation scheme being used. As discussed herein, the predetermined sequence of frequency and modulation scheme combinations may be established at any time, such as during a handshaking process prior to communications between two controllers 118.

In the case of time based synchronization, where the next frequency and modulation scheme combination is used at a particular time or after the lapse of a particular period of time, may be implemented by synchronizing clocks associated with each of the communicating controllers 118. The clock synchronization process may be used to reduce and/or eliminate any drift between local clocks of the controllers 118. The clock synchronization process may involve the master controller 118 sending a clock synchronization message with its own clock time (e.g., the master clock time is indicated in the payload 136 of the clock synchronization data packet 132) to all of the other controllers 118 with which it is communicating. When the subordinate controllers 118 receive the clock synchronization message, the subordinate controllers 118 identify the master time indicated in the payload of the data packet 132 and update their own clocks with the master time. In this way, the clocks of all of the controllers 118 are synchronized so that all of the controllers 118 use the same frequencies and modulation schemes during communications. Thus, when a period of time associated with a particular frequency and/or modulation scheme expires, all of the communicating controllers 118 are synchronized by way of their respective clocks to switch to the next frequency and/or modulation scheme combination in a synchronized manner.

With respect to the data packet 132, the payload 136 may be of any suitable size (e.g., 8 bits, 16 bits, 32 bits, 64 bits, 128 bits, 256 bits, 512 bits, 1024 bits, etc.). Furthermore, the payload 136 may carry any suitable information therein. For example, a master controller 118 may send instructions to subordinate controllers 118, such as an instruction to accelerate, decelerate, change wheel slip, request sensor data (e.g., LiDAR data, power view data, strain gauge data, etc.). As additional examples, subordinate controllers 118 may provide status update(s) (e.g., sensor data, brake status, engine status, message acknowledgements, etc.). According to examples of the disclosure, any suitable information may be communicated within the payload 136 of one or more data packets 132.

The header 134 of the data packet 132, as disclosed herein, may include an identifier of the receiving controller 118. The identifier may be any suitable descriptor, such as the receiving controller's OPK 124, other key(s) 126, serial number, or any other identifier. The header 134 identifies the receiving controller 118 to the receiving controller 118, as well as to other controllers 118 for which the data packet 132 is not intended. In some cases, the communications along the consist 104 may be point-to-point, where a controller 118 receives a wireless signal 114, decodes the wireless signal 114 according to the current frequency and modulation scheme to be used, and then identify the identifier in the header 134 of the intended recipient controller 118. If the identifier matches that of the controller 118 performing these actions, then that controller 118 then reads and/or acts upon the payload 136. Otherwise, the controller 118 retransmits the wireless signal to the next controller 118. In this way, the message to be communicated gets passed along in a point-to-point or daisy chain manner. Alternatively, the wireless signal may be broadcast, where the recipient controller 118 receives and/or acts upon the data packet 132 carried by the wireless signal, while the other controllers 118 also receiving that wireless signal merely ignore the constituent data packet 132. Indeed, the disclosure contemplates any suitable mechanism for relaying the messages, as carried by data packets 132 and encoded onto the wireless signals 114, from the sending controller 118 to the receiving controller 118.

As discussed herein, the controller 118 of a locomotive 102 may be configured to communicate with other controller(s) 118 of other locomotives in a secure and hacking-resistant manner. One or both of the frequency (e.g., channel) and/or modulation scheme may be changed in a predetermined pattern known to both the sending and receiving controllers 118. However, since the frequency and/or modulation hopping scheme is not known to a potential malicious actor, the security and hacking-resistance of the communications is improved over what it would otherwise be.

FIG. 2 is a flow diagram depicting an example method 200 for communicating between locomotives 102 with a coordinated frequency and/or modulation hopping scheme, according to examples of the disclosure. The processes of method 200 may be performed by the controller 118 in cooperation with one or more elements of environment 100 of FIG. 1. Alternatively, method 200 may be performed by one or more other controllers of the locomotive 102 or a communications system of the locomotive 102. In some cases, method 200 may be performed by a master controller 118 or a controller 118 that is sending data to another controller 118.

At block 202, the controller 118 may perform a handshaking protocol with a recipient locomotive 102, or its controller 118, that includes communicating a frequency and/or modulation scheme sequence. As disclosed herein, the frequency and/or modulation scheme sequence may be indicated to the receiving controller(s) 118 in a number of possible ways. In some cases, the controller 118 may send a sequence table indicating the repeating sequence of frequencies used and/or modulation schemes used. In other cases, the handshaking process may involve exchanging identifiers and/or keys of the different controllers 118. The exchange of identifiers and/or keys may enable the other controllers 118 to identify a sequence, such as in the form of a table indicating step-by-step changes in the frequency to be used and/or the modulation scheme to be used for communicating. In this case, the controllers 118 may have stored on their respective memories, one or more different sequences, and depending on the controller 118 with which communications is to be established the controllers may invoke the corresponding sequence table(s).

It should be understood that the handshaking protocols may involve the exchange of additional information other than those that are associated with the frequency and/or modulation hopping schemes disclosed herein. It should further be understood that in some cases, only a frequency hopping scheme may be used, without modulation hopping. In other cases, only modulation hopping may be used, without frequency hopping. In yet further cases, both frequency hopping and modulation hopping may be used for communications between controllers 118.

At block 204, the controller 118 may identify data to be sent to the recipient locomotive 102 (e.g., the recipient locomotive's controller 118 or other communications system). For example, a master controller 118 may send instructions to subordinate controllers 118, such as an instruction to accelerate, decelerate, change wheel slip, request sensor data (e.g., LiDAR data, power view data, strain gauge data, etc.). As additional examples, subordinate controllers 118 may provide status update(s) (e.g., sensor data, brake status, engine status, message acknowledgements, etc.). According to examples of the disclosure, any suitable information may be communicated within the payload 136 of one or more data packets 132.

At block 206, the controller 118 may generate a data packet 132 that include an identifier of the recipient loco-motive 102 and the data. The header 134 of the data packet 132, as disclosed herein, may include the identifier of the receiving controller 118. The identifier may be any suitable descriptor, such as the receiving controller's OPK 124, other key(s) 126, serial number, or any other identifier. The header 134 identifies the receiving controller 118 to the receiving controller 118, as well as to other controllers 118 for which the data packet 132 is not intended.

At block 208, the controller 118 may send the data packet to the recipient locomotive 102 using a frequency and/or modulation scheme according to the frequency and/or modulation sequence. With respect to the data packet 132, the payload 136 may be of any suitable size (e.g., 8 bits, 16 bits, 32 bits, 64 bits, 128 bits, 256 bits, 512 bits, 1024 bits, etc.). Furthermore, the payload 136 may carry any suitable information therein. If he data to be sent is greater than the payload size of data packets 132 used, then the data may be broken up and sent in multiple data packets 132 and the recipient controller 118 can stich the data back together from the multiple data packets 132.

In the case of only frequency hopping communications, any number of suitable channels/frequencies may be used. In some cases, there may be four channels: Channel 1:452.925 MHz; Channel 2:452.950 MHz; Channel 3:457.925 MHz; and Channel 4:457.950 MHz. In this case, the controller 118 may transmit wireless signals 114 via their respective antenna 112 carrying one or more data packets 132 in a sequence that hops between the four aforemen-tioned frequencies. At any given time, the frequency to be used will be determined, using the frequency sequence, and the data packet will be sent using that frequency. It should be understood that the number of channels and/or the associated frequencies are merely examples. The disclosure herein contemplates any number of suitable channels/fre-quencies and at any frequency level. For example, alternate or additional channels may include 160 MHZ, 161 MHZ, 220 MHZ, or similar frequencies, or indeed any other frequencies that may be used for communications.

In the case of only modulation hopping communications any number of suitable modulation schemes may be used. In some cases, there may be four different modulation schemes: frequency shift keying (FSK); Gaussian frequency shift keying (GFSK); quadrature phase shift keying (QPSK); and phase shift keying (PSK). In this case, a sending or trans-mitting controller 118 may transmit wireless signals 114 via their respective antenna 112 carrying one or more data packets 132 in a sequence that hops between the four aforementioned modulation schemes. At any given time, the modulation scheme to be used will be determined, using the modulation sequence, and the data packet will be sent using that modulation scheme. It should be understood that the number and/or type of modulation schemes are merely examples. The disclosure herein contemplates any number of suitable modulation schemes of any suitable type. For example, alternate or additional channels may include binary phase shift keying (BPSK), higher order phase shift keying, amplitude modulation (AM), quadrature amplitude modulation (QAM), amplitude shift keying (ASK), combi-nations thereof, or indeed any other modulation schemes that may be used for communications.

In the case of both the frequency and the modulation scheme hopping for communications between two controllers 118 any number of combinations of frequencies and modulation schemes may be used. At any given time, the frequency to be used and the modulation scheme to be used will be determined, using the frequency and modulation sequence, and the data packet will be sent using that frequency and modulation scheme.

It should be understood that when both the modulation scheme and the frequency for communications changes with time, there can be a relatively largen number of potential combinations, thereby thwarting any potential malicious actors from attempting to predict he channels/modulation schemes being used to communicate between controllers. It should further be understood that the communications between controllers 118 may further be encrypted to provide an additional layer of security using any suitable mecha-nism, such as a public-private key mechanism. In some cases, the bandwidth available for transmission may be variable based on the frequencies and/or modulation schemes used. For example, higher frequencies may support greater data throughput and/or data bandwidth than with lower frequencies. Similarly, quadrature-based modulation schemes (Q and I signal based) may provide greater data throughput and/or data bandwidth than with non-quadrature techniques.

It should be noted that some of the operations of method 200 may be performed out of the order presented, with additional elements, and/or without some elements. Some of the operations of method 200 may further take place sub-stantially concurrently and, therefore, may conclude in an order different from the order of operations shown above.

FIG. 3 is a flow diagram depicting an example method 300 for securely transmitting messages, according to examples of the disclosure. The processes of method 300 may be performed by the controller 118 in cooperation with one or more elements of environment 100 of FIG. 1. Alternatively, method 300 may be performed by one or more other controllers or communications system(s) of the loco-motive 102. In some cases, method 300 may be performed by a subordinate controller 118 or a controller 118 that is receiving data from another controller 118, such as a master controller 118 (e.g., a controller 118 of the lead locomotive 102).

At block 302, the controller 118 may the controller 118 may perform the handshaking protocol with the transmitting locomotive 102 that incudes identifying a frequency and/or modulation sequence. As disclosed herein, the frequency and/or modulation scheme sequence may be indicated to the receiving controller(s) 118 in a number of possible ways. In some cases, the controller 118 may receive a sequence table indicating the repeating sequence of frequencies used and/or modulation schemes used. In other cases, the handshaking process may involve exchanging identifiers and/or keys of the different controllers 118. The receipt of identifiers and/or keys may enable the controller 118 to identify a sequence, such as in the form of a table indicating step-by-step changes in the frequency to be used and/or the modulation scheme to be used for communicating. In this case, the controllers 118 may have stored on their respective memories, one or more different sequences, and depending on the other controller 118 with which communications is to be established, the controller 118 may invoke the corresponding sequence table(s).

It should be understood that the handshaking protocols may involve the exchange of additional information other than those that are associated with the frequency and/or modulation hopping schemes disclosed herein. It should further be understood that in some cases, only a frequency hopping scheme may be used, without modulation hopping. In other cases, only modulation hopping may be used, without frequency hopping. In yet further cases, both frequency hopping and modulation hopping may be used for communications between controllers 118.

At block 304, the controller 118 may receive a signal at a frequency according to the frequency and/or modulation sequence. The controller 118 may know the frequency and/or range of frequency to monitor, since the controller 118 is aware of the frequency to be used at that point in time, according to the frequency and/or modulation sequence. Thus, the controller 118 may set receiving elements, such as in an SDR mode, to receive the appropriate frequency that is tom be used for any incoming message. For example, the controller 118 may set real or virtual filters, such as high-pass filters, low-pass filters, and/or bandpass filters, to capture the signal, as sent by another controller 118.

At block 306, the controller 118 may demodulate the received signal using a demodulation scheme according to the frequency and/or modulation sequence to determine a data packet 132. Again, the controller may determine using the frequency and/or modulation sequence, what modulation (and, correspondingly demodulation scheme) is to be used at the time the signal is received to decode the signal. Again, the sender and the receiver knows both the frequency to use and the modulation (and corresponding demodulation) scheme to use for communications.

It should be noted that with respect to blocks 304 and 306, one of the blocks may be optional. In other words, in some cases, only a frequency hopping technique may be used to communicate between controllers 118. In other cases, only a modulation hopping technique may be used to communicate between controllers 118. Of course, in other cases, both a modulation and frequency hopping technique may be used, for which both of the processes of blocks 304 and 306 are implemented.

At block 308, the controller 118 may identify a recipient identifier in the header 134 of the data packet 132. In particular, the intended recipient may be indicated, such as by an identifier of the intended recipient, in the header 134 of the data packet 132. After decoding the data packet 132, the controller is able to read the recipient identifier from the header 134 of the data packet 132.

At block 310, the controller 118 may determine whether the signal is to be retransmitted. The controller may determine that the signal is to be retransmitted if the data packet carried by the signal is not intended for the controller 118, but rather for another controller 118. The controller 118 may compare its own identifier to the identifier of the intended recipient of the data packet 132 to make the determination of whether the data packet is intended for the controller 118. If the data packet 132 is not intended for the controller 118, then it is to be retransmitted, so that it can arrive to the intended recipient (e.g., another controller 118 of another locomotive 102).

If the signal is to be retransmitted, then at block 312, the controller 118 retransmits the signal. In some cases, the signal may be stored in memory and/or storage associated with he controller 118, so that it can be repeated as a wireless signal 114 to be retransmitted by the antenna 112 associated with the controller 118. In other cases, the controller 118 may reconstitute the received signal to retransmit it, again via its associated antenna 112 as a wireless signal 114. However, if at block 310, the controller 118 determines that the signal is not to be retransmitted, then at block 314, the controller 118, optionally, may transmit an acknowledgement to the signal. The acknowledgement may indicate to the sender of the data packet 132 that the data packet has been received by the intended recipient (e.g., the controller 118).

It should be noted that method 200 may be performed by a sending controller 118 and or a master controller 118 and method 300 may be performed by a receiving controller 118 and/or a subordinate controller 118. Method 200 and method 300 may be performed in an interleaved manner by their respective actors (e.g., the two controllers 118 communicating).

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
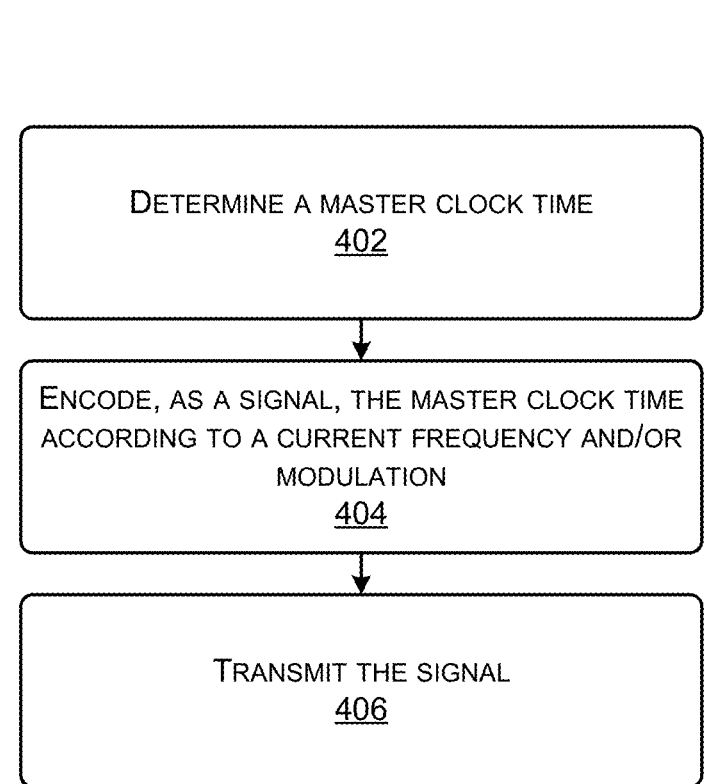
FIG. 4 is a flow diagram depicting an example method for transmitting a clock synchronization message, according to examples of the disclosure.

FIG. 4 is a flow diagram depicting an example method 400 for transmitting a clock synchronization message, according to examples of the disclosure. The processes of method 400 may be performed by the controller 118 in cooperation with one or more elements of environment 100 of FIG. 1. Alternatively, method 400 may be performed by one or more other controllers or communications system(s) of the locomotive 102. In some cases, method 400 may be performed by a master controller 118 or a controller 118 that is sending data to another controller 118.

At block 402, the controller 118 may determine a master clock time. The clock may be part of the controller 118 or as a separate element electrically and/or communicatively coupled, such as in a common circuit, with the controller 118. The clock may be any suitable type of clock, that keeps time for the controller 118. In some cases, there may be a system clock, such as an oscillator, for circuit timing, and the controller may have registers and/or other hardware that counts system clock transitions to provide a time based on the system clock.

At block 404, the controller 118 may encode as a signal, the master clock time according to a current frequency and/or modulation. The master clock time may be encoded in the payload 136 of a data packet 132. The data packet may also have a header 134 that indicates another controller 118 or multiple other controllers 118 that is to receive this synchronization message including the master clock time. The encoding of the synchronization message may be according to the current frequency and/or modulation scheme to be used at that point of time. Thus, when a recipient (e.g., another controller 118) receives the signal, it will decode that signal according to the current frequency and/or demodulation scheme.

At block 406, the controller 118 may transmit the signal. The controller 118 may transmit the signal as a wireless signal 114 via the antenna 112 associated with the controller 118.

It should be appreciated that by transmitting its own time, as a master clock time, a master controller 118 (e.g., a controller 118 of the lead locomotive 102) can cause all the other controllers 118 with which it is to communicate to synchronize their local clocks to the master clock time. In this way, all the controllers 118 may be using the same (or nearly the same) time to identify which frequency and/or modulation scheme to use for communications.

It should be noted that some of the operations of method 400 may be performed out of the order presented, with additional elements, and/or without some elements. Some of the operations of method 400 may further take place substantially concurrently and, therefore, may conclude in an order different from the order of operations shown above.

Figure 5:
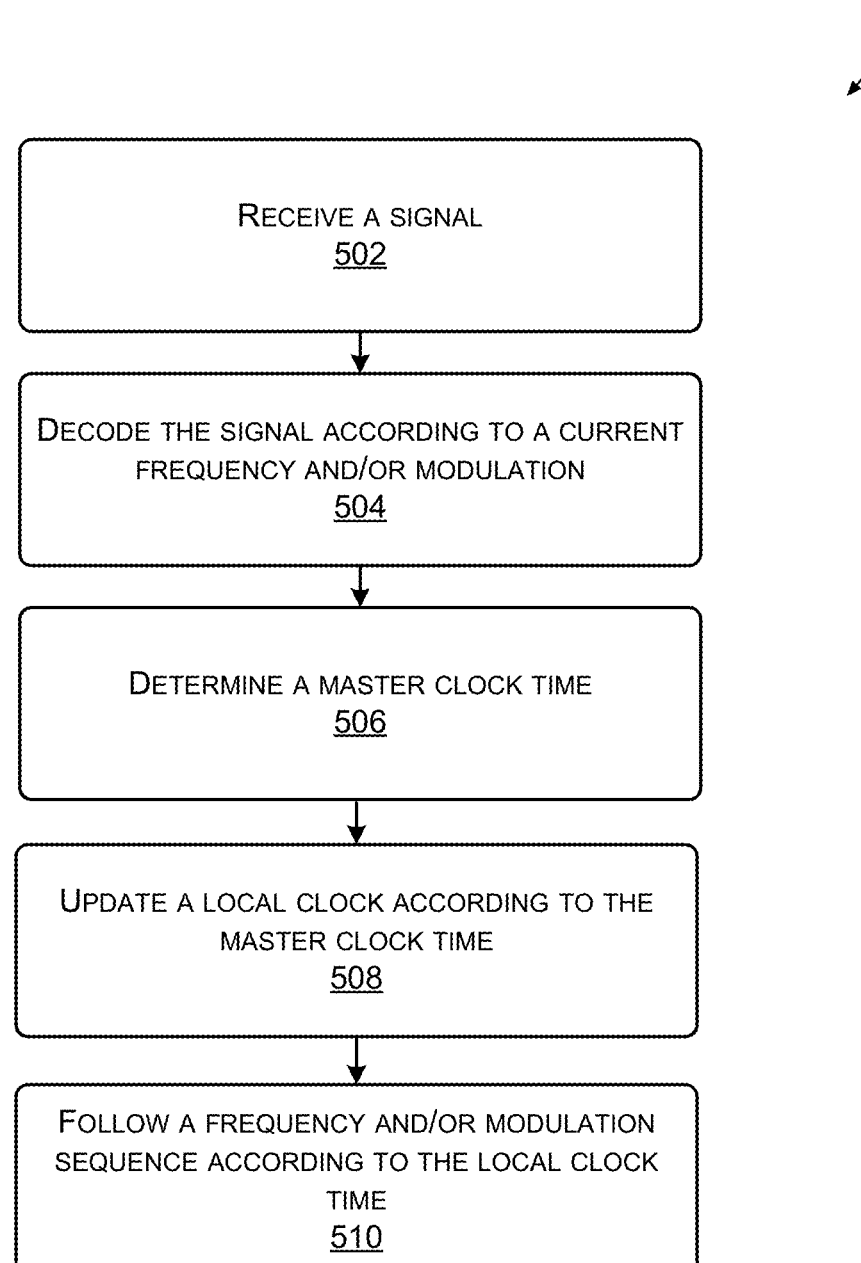
FIG. 5 is a flow diagram depicting an example method for synchronizing clocks for secure communications, according to examples of the disclosure.

FIG. 5 is a flow diagram depicting an example method 500 for synchronizing clocks for secure communications, according to examples of the disclosure. The processes of method 500 may be performed by the controller 118 in cooperation with one or more elements of environment 100 of FIG. 1. Alternatively, method 500 may be performed by one or more other controllers or communications system(s) of the locomotive 102. In some cases, method 500 may be performed by a subordinate controller 118 or a controller 118 that is receiving data from another controller 118, such as a master controller 118 (e.g., a controller 118 of the lead locomotive 102).

At block 502, the controller 118 may receive a signal. The signal may be the signal transmitted by a master controller 118, such as in block 406 of method 400, as described in conjunction with FIG. 4 above. This signal, therefore, may be carrying a master clock time to which the controller 118 is to synchronize its own local clock. As described in conjunction with FIG. 3, the recipient controller 118 may access the frequency and/or modulation sequence to determine the frequency or channel over which the signal may be received. As a result, the controller 118 can be monitoring the frequency over which communications is expected. This monitoring of the expected frequency may be by controlling any variety of real or virtual frequency/pass filters.

At block 504, the controller 118 may decode the signal according to a current frequency and/or modulation. As described in conjunction with FIG. 3, the recipient controller 118 may access the frequency and/or modulation sequence to determine the modulation scheme with which the signal may be encoded. Thus, the controller 118 may use the reciprocal decoding scheme to decode the signal and determine the constituent data packet 132.

At block 506, the controller 118 may determine a master clock time from the received signal. Assuming that the data packet 132 is intended for the controller 118, the payload 136 may indicate the master clock time. This master clock time may be the time associated with a master controller 118, such as a controller 118 of a lead locomotive 102.

At block 508, the controller 118 may update a local clock according to the master clock time. By updating the local clock associated with the controller 118, any drift between the master clock time and the local clock time may be reduced and/or eliminated. As a result, the local clock time may then be synchronized with the master clock time of a master controller 118.

At block 510, the controller 118 may follow a frequency and/or modulation sequence according to the local clock time. After the local clock is updated, the controller 118 may continue using the local clock, in conjunction with the frequency and/or modulation sequence, to determine which frequency and/or modulation scheme to use at any given time to communicate with eh master controller 118 or any other controller 118 of the locomotives 102 of the consist 104.

It should be noted that the clock synchronization of methods 400 and 500, of FIGS. 4 and 5, respectively, may be conducted on a periodic basis to minimize the drift between the various clocks associated with eh various controllers 118 of a consist 104. For example, in some cases, the clocks may be synchronized every 20 seconds. In other cases, the clocks may be synchronized once every minute. Indeed, the clocks may be synchronized at any suitable frequency.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
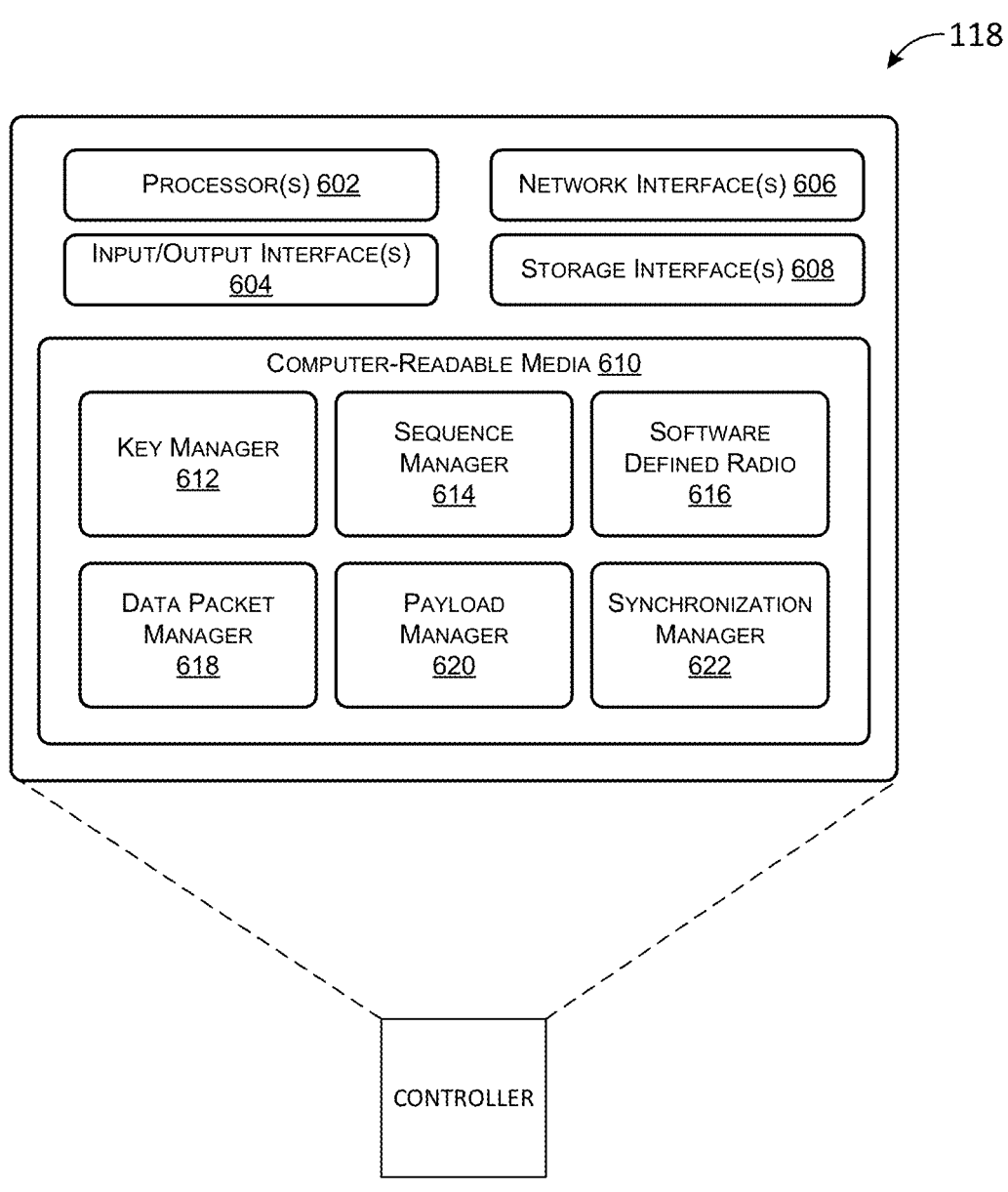
FIG. 6 is a block diagram of an example controller of a locomotive of FIG. 1, according to examples of the disclosure.

FIG. 6 is a block diagram of an example controller 118 of a locomotive 102 of FIG. 1, according to examples of the disclosure. The controller 118 includes one or more processor(s) 602, one or more input/output (I/O) interface(s) 604, one or more network interface(s) 606, one or more storage interface(s) 608, and computer-readable media 610.

In some implementations, the processors(s) 602 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems. The one or more processor(s) 602 may include one or more cores.

The one or more input/output (I/O) interface(s) 604 may enable the controller 118 to detect interaction with an operator of the locomotive (e.g., train engineer). For example, the operator may provide the controller 118 with desired operating conditions. Thus, the I/O interface(s) 604 may include and/or enable the controller 118 to receive and/or send information that is to be used to control the coupling of consists 104.

The network interface(s) 606 may enable the controller 118 to communicate via the one or more network(s). The network interface(s) 606 may include a combination of hardware, software, and/or firmware and may include software drivers for enabling any variety of protocol-based communications, and any variety of wireline and/or wireless ports/antennas. For example, the network interface(s) 606 may comprise one or more of WiFi, cellular radio, a wireless (e.g., IEEE 802.1x-based) interface, a Bluetooth® interface, and the like. The network interface(s) 606 may enable the controllers 118 of a consist 104 to communicate with each other, communicate with other components of the locomotives 102, communicate with the ground station 116, and/or communicate with any variety of other elements.

The storage interface(s) 608 may enable the processor(s) 702 to interface and exchange data with the computer-readable medium 610, as well as any storage device(s) external to the controller 118, such as any type of datastore that might be used to store, track, and/or retrieve BTMS unit usage data. The storage interface(s) 708 may further enable access to removable media.

The computer-readable media 610 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 610 may be implemented as computer-readable storage media (CRSM), which may be any available physical media accessible by the processor(s) 602 to execute instructions stored on the memory 610. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 602. The computer-readable media 610 may have an operating system (OS) and/or a variety of suitable applications stored thereon. The OS, when executed by the processor(s) 602 may enable management of hardware and/or software resources of the controller 118.

Several components such as instruction, datastores, and so forth may be stored within the computer-readable media 610 and configured to execute on the processor(s) 602. The computer readable media 610 may have stored thereon a key manager 612, a sequence manager 614, a software defined radio 616, a data packet manager 618, a payload manager 620, and synchronization manager 622. It will be appreciated that each of the components 612, 614, 616, 618, 620, 622 may have instructions stored thereon that when executed by the processor(s) 602 may enable various functions pertaining to battery thermal management, as described herein.

The instructions stored in the key manager 612, when executed by the processor(s) 602, may configure the controller 118 to store, share, and/or otherwise manage any variety of key(s) and/or identifiers, such as the operational private key (OPK) 124. The controller 118 operating as a master controller 118 may be configured to provide the OPK 124 and/or any other key(s) 126 that may enable the frequency hopping and/or modulation hopping techniques disclosed herein. Operating as a subordinate controller 118, the controller 118 may be configured to receive OPK 124 and o other key(s) 126 from a master controller (e.g., a controller 118 of the lead locomotive 102). The controllers 118 may be configured to identify a hopping sequence and/or schedule based at least in part on any received keys and/or identifiers. The controllers 118 may further be configured to determine whether any message is intend for it, based at least in part in identifying information, such as in the header 134 or received data packets 132.

The instructions stored in the sequence manager 614, when executed by the processor(s) 602, may configure the controller 118 to identify a sequence and/or schedule of frequency hopping to be used, modulation hopping to be used, or both frequency and modulation hopping to be used for communications. The sequence and/or schedule may be established between two or more communicating controllers 118 may any suitable mechanism, such as during a handshaking process. In some cases, a table depicting the hopping sequence and/or schedule may be transmitted between controllers 118 that are to communicate. In other cases, a number of different hopping sequences and/or schedules may be stored in the memory 610 of the controller 118 and the proper one to be used may be determined based at least in part on the master controller's OPK 124 or other identifying information. In yet other cases, the hopping sequence and/or schedule may be algorithmically determined based at least in part on one or more key(s), such as the OPK of one or more of the communicating controllers 118.

The instructions stored in the software defined radio 616, when executed by the processor(s) 602, may configure the controller 118 to operate as software defined radio (SDR), where the controller 118 is able to encode and/or decode wireless signals using a number of different frequencies and/or modulation schemes. As disclosed herein, the controller 118 operating as an SDR may be configured to encode and/or decode messages according to all of the frequencies and/or modulation schemes to be used according to the sequence/schedule of frequency and/or modulation hopping.

The instructions stored in the data packet manager 618, when executed by the processor(s) 602, may configure the controller 118 to generate and or read data packets 132. The controller 118 may be configured to generate data packets 132 to be transmitted with an identifier of the intended recipient (e.g., the receiving controller 118) indicated in the header 134 of the data packet 132. Receiving controllers 118 may be configured to decode (e.g., receive the signal on the current frequency/channel and decode the data packet 132 from the received signal) the signal and determine if the controller 118 is the intended recipient. If the controller 118 is the intended recipient, then the controller 118 operates according to instructions and/or information provided in the payload 136 of the data packet 132. On the other hand, if the controller 118 is not the intended recipient of the data packet, as determined from the identifier in the header 134 of the data packet 132, then the controller 118 may retransmit the signal, so that it may reach the intended recipient (e.g., a different controller 118).

The instructions stored in the payload manager 620, when executed by the processor(s) 602, may configure the controller 118 to construct the data packet 132 to be encoded according to the scheduled current frequency and/or modulation scheme. The payload 136 of the data packet 132 may include any suitable information, such as instructions, acknowledgements, master time, other timing information, sequence tables, schedule tables, sensor readings, follow-up instructions, human inputs, combinations thereof, or the like.

The instructions stored in the synchronization manager 622, when executed by the processor(s) 602, may configure the controller 118 to generate a synchronization message, such as a message that indicates the time from a master clock, such as a clock associated with the controller 118 of the lead locomotive 102. The master clock time may be indicated in the payload 136 of the data packet 132. When a controller receives the synchronization data packet, the controller may decode the data packet 132 according to the sequence/schedule of frequencies and/or modulation schemes and then update its own local clock with the master time, as provided in the payload 136 of the synchronization data packet 132.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other cases, the databases shown can be integrated or distributed into any number of databases or other data storage devices.

INDUSTRIAL APPLICABILITY

The present disclosure describes systems and methods for improved security of communications between locomotives 102 of train consists 104. Improved security is achieved by implementing a frequency and/or modulation hopping scheme that is known by the two or more parties (e.g., controllers 118) that are to communicate. However, because a malicious actor does not know the frequency and/or modulation hopping sequence and/or schedule, that malicious actor may be prevented from intercepting, blocking, retransmitting, and/or otherwise modifying any communications between two locomotives 102.

The systems and methods, as disclosed herein, provide the ability to operate trains, consists, and/or network of trains automatically, semi-automatically, or at least with reduced human intervention. To implement automatic train operations (ATO) and/or near ATO operations, the locomotives 102 of train consists 104 need to be able to communicate amongst themselves to provide the distributed power, braking, and/or other controls needed for ATO. This communications between locomotives 102 of the same consist 104, or even locomotives from different consists 104, need to be highly reliable. If the communications between locomotives 102 is faulty, such as due to hacking by a malicious actor, problems may arise in train operations, such as inconsistent operations or even break-in-twos or derailment. Thus, reliable communication between trains is needed for ATO or near-ATO operations of trains and network of trains.

By employing the systems and methods, as disclosed herein, railroad operational efficiency, reliability, and consistency can be improved by enabling more automated operations of trains. Thus, train operators can deploy trains with reduced risk of hacking and other security issues. The trains, by implementing the frequency hopping and/or modulation hopping techniques, as disclosed herein can reduce the possibility of malicious elements hijacking or otherwise controlling train assets on a rail network. This may lead to reduced possibility of damage to the trains and/or reduced possibility of derailments. Additionally, by enabling ATO or near ATO, the railroad operators can operate trains with reduced downtime. This results in more efficient freight and/or passenger movement and overall, more efficiency of a railroad operator. The improved time efficiency of use of railroad assets lead to financial benefits, such as improved cost of ownership and improved return on investment for railroad operators, among other benefits.

Although the systems and methods of trains, locomotives, cars, and consists 104 are discussed in the context of a freight trains, it should be appreciated that the systems and methods discussed herein may be applied to a wide array of trains and/or similar vehicles operating on tracks across a wide variety of industries, such as construction, mining, farming, transportation, military, combinations thereof, or the like. For example, the coupling and decoupling controls disclosed herein may be applied to light subway electric trains that are to be coupled at or near operating speeds.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A locomotive, comprising:

a controller including one or more processors; and one or more computer-readable media storing computer-executable instructions that, when executed by the controller, cause the controller to:

send first data to a second controller, the second controller associated with a second locomotive, the first data including an identifier of the controller;

receive, based at least in part on the first data, an acknowledgement message from the second controller;

send, at a first time, second data to the second controller using a first channel associated with a first frequency and using a first modulation scheme;

send, at a second time, third data to the second controller using a second channel associated with a second frequency and using a second modulation scheme; and send, at a third time, fourth data to the second controller using a third channel associated with a third frequency and using a third modulation scheme, wherein the third frequency is different from the first frequency and different from the second frequency, and wherein the third modulation scheme is different from the first modulation scheme and the second modulation scheme.

2. The locomotive of claim 1, wherein the computer-executable instructions, when executed by the controller, further cause the controller to:

encrypt the second data.

3. The locomotive of claim 1, wherein the first frequency is at least one of: 452.925 Megahertz (MHz); 452.950 MHz; 457.925 MHz; or 457.950 MHz.

4. The locomotive of claim 1, wherein the first modulation scheme is at least one of: frequency shift keying (FSK); Gaussian frequency shift keying (GFSK); quadrature phase shift keying (QPSK); or phase shift keying (PSK).

5. The locomotive of claim 1, wherein the first data includes an operational private key (OPK) associated with the controller.

6. The locomotive of claim 1, wherein the computer-executable instructions, when executed by the controller, further cause the controller to:

generate a data packet having a header and a payload, wherein the header includes an identifier associated with the second controller and the payload includes the second data.

7. The locomotive of claim 1, wherein the computer-executable instructions, when executed by the controller, further cause the controller to:

receive, responsive to sending the second data, an acknowledgement message from the second controller.

8. The locomotive of claim 1, wherein the computer-executable instructions, when executed by the controller, further cause the controller to:

determine a master time;

generate synchronization data based at least in part on the master time; and send the synchronization data to the second controller.

9. A method of communicating between a first locomotive and a second locomotive, comprising:

identifying, by a controller, a first data to be transmitted to the second locomotive;

sending, by the controller and at a first time, the first data to the second locomotive using a first modulation scheme and a first frequency;

identifying, by the controller, a second data to be transmitted to the second locomotive;

sending, by the controller and at a second time, the second data to the second locomotive using a second modulation scheme different from the first modulation scheme and a second frequency different from the first frequency; and sending, by the controller and at a third time, third data to the second locomotive using a third frequency and using a third modulation scheme, wherein the third frequency is different from the first frequency and different from the second frequency, and wherein the third modulation scheme is different from the first modulation scheme and the second modulation scheme.

10. The method of communicating between a first locomotive and a second locomotive of claim 9, further comprising:

sending identity data to the second locomotive, the identity data including an identifier of the controller.

11. The method of communicating between a first locomotive and a second locomotive of claim 10, wherein the identity data includes an operational private key (OPK) associated with the controller.

12. The method of communicating between a first locomotive and a second locomotive of claim 9, further comprising:

identifying, by the controller, a fourth data to be transmitted to a third locomotive; and sending, by the controller and at a fourth time, the fourth data to the third locomotive using the second modulation scheme.

13. The method of communicating between a first locomotive and a second locomotive of claim 9, further comprising:

determining a master time;

generating synchronization data based at least in part on the master time; and sending the synchronization data to the second locomotive.

14. A locomotive communication system, comprising:

a controller including one or more processors; and one or more computer-readable media storing computer-executable instructions that, when executed by the controller, cause the controller to:

receive identity data from a second controller, the second controller associated with a second locomotive, the identity data including an identifier of the second controller;

determine, based at least in part on the identifier, a modulation scheme sequence;

receive, at a first frequency, a first signal from the second controller;

identify, based at least in part on the modulation scheme sequence, a first demodulation scheme to use to decode the first signal;

decode the first signal using the first demodulation scheme;

receive, at a second frequency different from the first frequency, a second signal from the second controller;

identify, based at least in part on the modulation scheme sequence, a second demodulation scheme to use to decode the second signal, wherein the second demodulation scheme is different from the first demodulation scheme;

decode the second signal using the second demodulation scheme;

receive, at a third frequency, a third signal from the second controller;

identify, based at least in part on the modulation scheme sequence, a third demodulation scheme to use to decode the third signal, wherein the third demodulation scheme is different from the first demodulation scheme and the second demodulation scheme; and decode the third signal using the third demodulation scheme.

15. The locomotive communication system of claim 14, wherein the computer-executable instructions, when executed by the controller, further cause the controller to:

determine a data packet based at least in part on decoding the first signal;

identify an intended recipient of the data packet; and retransmit, based at least in part on the intended recipient, the first signal.

16. The locomotive communication system of claim 14, wherein the computer-executable instructions, when executed by the controller, further cause the controller to:

determine, based at least in part on the identifier, a frequency sequence; and identify, based at least in part on the frequency sequence, the first frequency over which the first signal is received, wherein receiving the first signal includes monitoring the first frequency.

17. The locomotive communication system of claim 14, wherein the computer-executable instructions, when executed by the controller, further cause the controller to:

receive a synchronization data from the second controller;

determine a master time based at least in part on the synchronization data; and update a local clock to the master time.

* * * * *

24